United States Patent [19]
Caridis et al.

[11] Patent Number: 5,407,692
[45] Date of Patent: Apr. 18, 1995

[54] PROCESS FOR TREATING FOOD PRODUCTS WITH STEAM

[75] Inventors: Andrew A. Caridis, San Carlos; Clark K. Benson, Millbrae; Steven G. Leary, San Mateo; Harold K. Jurevskis, Pacifica, all of Calif.

[73] Assignee: Heat and Control, Inc., South San Francisco, Calif.

[21] Appl. No.: 184,597

[22] Filed: Jan. 21, 1994

Related U.S. Application Data

[60] Division of Ser. No. 873,379, Apr. 24, 1992, Pat. No. 5,322,007, which is a continuation-in-part of Ser. No. 745,437, Aug. 15, 1991, abandoned.

[51] Int. Cl.$^6$ .................................................. A23L 1/00
[52] U.S. Cl. ..................... 426/510; 426/511; 426/523
[58] Field of Search .............. 426/509, 510, 511, 520, 426/523; 126/21 A, 369; 99/386, 427, 473, 476, 477, 479, 443 C; 432/133; 198/838

[56] References Cited

U.S. PATENT DOCUMENTS

| | | | |
|---|---|---|---|
| 4,058,635 | 11/1977 | Durth | 426/510 |
| 4,363,263 | 12/1982 | Williams | 99/443 C |
| 4,367,724 | 1/1983 | Willett | 126/369 |
| 4,569,658 | 2/1986 | Wiggins et al. | 99/473 |
| 4,582,047 | 4/1986 | Williams | 126/369 |
| 4,612,911 | 9/1986 | Onodera | 99/477 |
| 4,631,029 | 12/1986 | Lanham et al. | 432/133 |
| 4,701,334 | 10/1987 | Durth | 426/523 |
| 4,726,766 | 2/1988 | Stewart et al. | 432/133 |
| 4,882,981 | 11/1989 | Bacigalupe et al. | 198/838 |
| 4,949,629 | 8/1990 | Leavy et al. | 99/386 |
| 5,109,758 | 5/1992 | Voegtlin | 99/427 |
| 5,189,948 | 3/1993 | Liebermann | 99/443 C |

OTHER PUBLICATIONS

Ashworth Brothers' shop drawings (1976) Nos. A2349, A2350, A2351, A2352, B2848 (1984).

Primary Examiner—George Yeung
Attorney, Agent, or Firm—Flehr, Hohbach, Test, Albritton & Herbert

[57] ABSTRACT

An oven with a box-like housing for efficient use of plant floor space encases a spiral food product carrying conveyor. A process vapor is circulated within the housing by "plug fans" with the inlet drawing vapor from the central axial zone of the spiral conveyor and exhausting into plenums along the periphery of the conveyor. The plenums have nozzles oriented tangentially to the conveyor for projecting the process vapor in a non-radial path over the food products.

9 Claims, 7 Drawing Sheets

FIG-7 ately uniform products. This is especially true where breaded chicken, meatloaf, shrimp and similar products are treated in a moving cooking atmosphere.

PROCESS FOR TREATING FOOD PRODUCTS WITH STEAM

This is a division of application Ser. No. 07/873,379 filed Apr. 24, 1992, now U.S. Pat. No. 5,322,007, which is a continuation-in-part of application Ser. No. 07/745,437 filed Aug. 15, 1992, now abandoned.

FIELD OF THE INVENTION

The present invention pertains to the treatment of food in a controlled atmosphere and particularly concerns an oven which is compact in its occupied floor area in relation to its cooking capacity and including therein an endless conveyor belt having a generally helical or spiral-form configuration. The oven permits a process vapor flow which maximizes heat transfer to the products with uniformity while minimizing the disturbance to the products carried on the conveyor belt.

BACKGROUND OF THE INVENTION

The continuous preparation of food products such as meat balls, chicken breasts, sausage links and patties and the like have been carried out very successfully within a controlled atmosphere contained within in a linear extending oven. Co-inventors Clark K. Benson and Andrew A. Caridis were named in patents which disclosed novel apparatus and processes for heating and cooking foods in a substantially closed treatment chamber, U.S. Pat. Nos. 3,947,241, granted Mar. 30, 1976, 4,167,585, granted Sep. 11, 1979, and 4,949,629, granted Aug. 21, 1990. The treatment chambers disclosed in those patents contain longitudinally extending, endless conveyors which carry the food products through the oven outlets which were displaced a distance from the oven inlets many times by as much as sixty feet thereby requiring on the order of seventy to seventy-five feet of unobstructed floor space in the processing plant where the ovens were installed. In numerous facilities the requisite length of floor space for an elongated oven was difficult to obtain and often plant building extensions were constructed to house the long ovens while in other instances the purchase of a long oven unit was deferred until space could be made available.

The advantages of increasing cooking conveyor length within a housing by including multiple conveyors within an oven are well understood. In some instances conveyors have been arranged in multiple passes with one conveyor flight stacked atop another. Further, the space-saving advantage of arranging the conveyor in a spiral configuration so as to obtain a long cook length in a volume more compact than that in a linear oven is well recognized. Among the problems that arise when configuring the food treatment conveyor in a spiral within a closed box-like housing is how best to promote the even flow of the process vapor with respect to the products carried upon the spiral conveyor belt. Certain workers in the field proposed creating a steady-state, static atmosphere within the oven enclosure while others proposed moving a cooking atmosphere vertically through the open rods or wire mesh in the spiral conveyor stack. Neither of these arrangements satisfies the need for minimizing the pockets of stagnant, slow-moving cooking vapor around the product. Where efficient use is made of the cooking vapor, virtually all of the products on a conveyor belt receive virtually the same heat load and exposure to the cooking vapor, which results in more predictable and uniform products. This is especially true where breaded chicken, meatloaf, shrimp and similar products are treated in a moving cooking atmosphere.

SUMMARY OF THE INVENTION

In one embodiment of the invention an oven is provided with an insulated housing having a product inlet, a product outlet and a spiral conveyor apparatus arranged within the housing including outside extending portions for conveying products through the oven inlet and outlet. The spiral conveyor may include a conveyor belt having a fabric-like array of bent-wire sections wherein individual sections are wrapped around pairs of transverse rods so as to create an extended, food product-supporting surface. A plurality of plenums are disposed along the outer periphery of the spiral conveyor at circumferentially spaced apart locations and nozzle means are arrayed on said plenums in positions serving to project a process vapor circulated therefrom substantially towards the perimeter of the spiral conveyor in a non-radial path. The nozzle means are arrayed in groups so that alternate groups project the process vapor countercurrent to the direction of conveyor movement while other groups direct the process vapor concurrent to the direction of conveyor movement. Fan means are arranged in the housing to circulate a cooking process vapor into the plenums through the nozzle means, across the conveyor flights which carry the food products and into a central axial zone of the conveyor for return to the fan inlet. Heating means are arranged in the plenums in the path of the process vapor circulated therethrough to reheat the process vapor.

An object of the present invention is to provide for cooking food products in an improved oven which occupies a compact area of plant floorspace where the products may be cooked with predictable uniformity at high efficiency per unit of heat input.

Another object of the invention is to provide an improved oven of the type described wherein the cooking process vapor is distributed over the food products arranged along a helical cooking surface wherein the heat supplied to the product is substantially uniform as measured transversely across the cooking surface.

Another object of the invention is to provide a cooking process which is highly energy-efficient for both cooking and browning food products on an inclined, helically-arranged cooking surface having a high-energy transfer to the food product engendered by turbulent vapor flow over the food product.

Further objects and advantages of the invention will become apparent from the accompanying drawings taken in combination with a detailed description of the preferred embodiments of the invention.

DETAILED DESCRIPTION OF THE INVENTION

Figure 1:
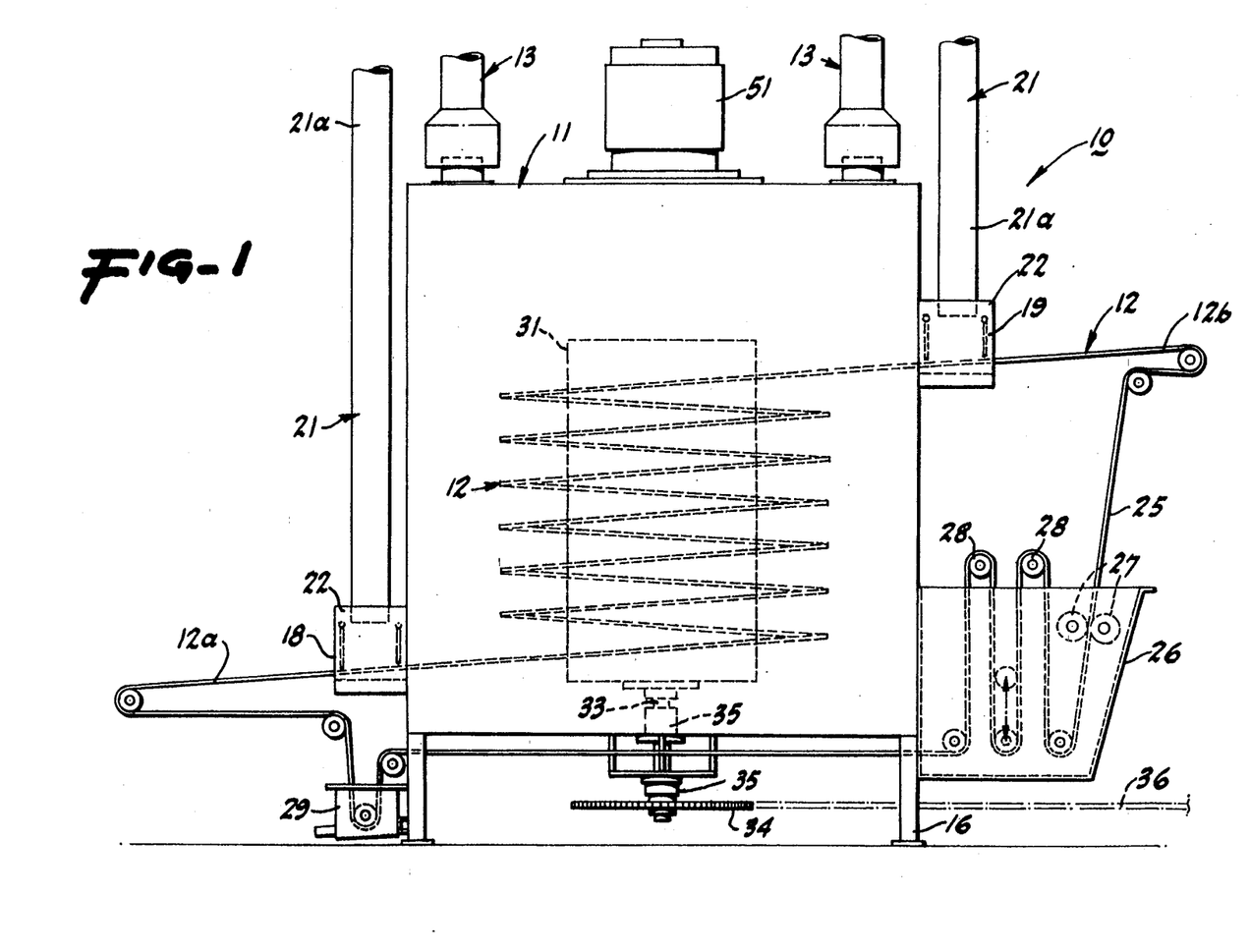
FIG. 1 is an elevation view of a compact, high-capacity oven having a spiral conveyor system and including the process vapor heating and distribution system of the present invention.
Figure 2:
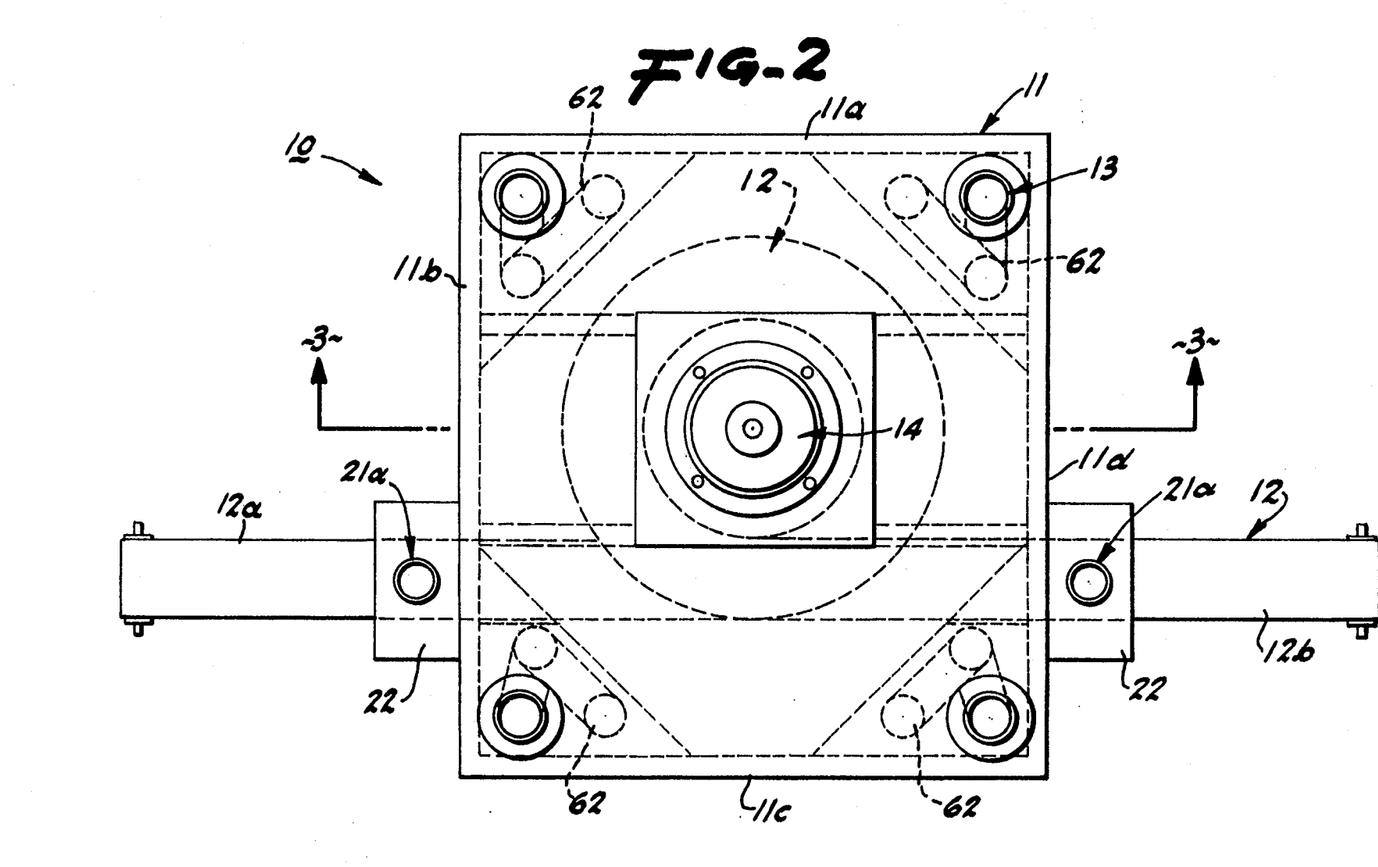
FIG. 2 is a plan view of the oven in FIG. 1.
Figure 3:
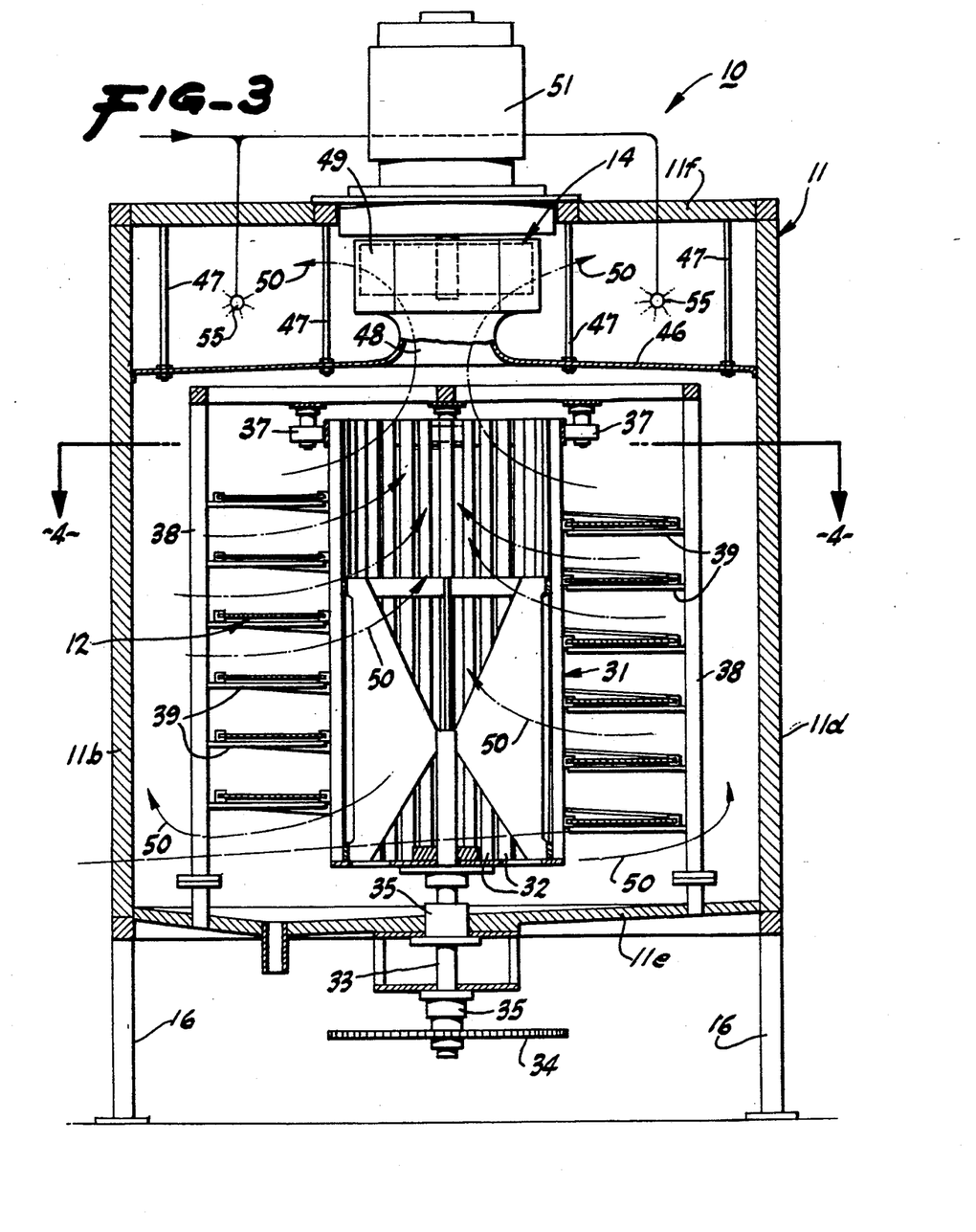
FIG. 3 is a cross-sectional view taken in the direction of the arrows 3—3 in FIG. 2.

There is shown in the drawings an improved compact oven 10 which is made in accordance with and embodying the principles of the present invention. Referring to FIGS. 1, 2 and 3, the oven 10 includes an insulated bore-like housing 11, a conveyor system 12, heating means 13 and cooking atmosphere circulating fan means 14 serving to move a process vapor through the oven along products carried by the conveyor system 12.

The oven housing 11 may be formed in the compact shape of a generally equilateral rectangle as viewed in the plan of FIG. 2. This affords a minimum "footprint" on the processing plant floor. The housing has four upstanding insulated sidewalls 11a, b, c, d, a bottom wall 11e, which may be water cooled or air cooled, and an insulated top wall 11f, FIG. 3. The housing 11 may be mounted on a support frame 16 at an elevation sufficient to provide clearance for components of the conveyor drive described below. The housing 11 is equipped with doors 17a, b, c and d (FIG. 4) to afford access to the interior for cleaning, maintenance and inspection purposes. Being that the oven 10 is intended for treatment of food products, all metal portions thereof which come into contact with or are proximate to the food products are formed from stainless steel as required to maintain a high hygienic standard. Thus, the interior walls of the housing 11 are formed of stainless steel sheets as is well known in the industry. The exterior of the housing 11 may as well be formed from stainless steel so as to present a clean appearance typical of well-made food processing equipment.

The housing 11 is provided with an inlet 18 wherein food products are received and an outlet 19 where food products are discharged after treatment, FIG. 1. Being that the housing is arranged so that food treatment processing therein may occur at a slight positive pressure over ambient, the inlet 18 and outlet 19 are each provided with a vapor control means 21 comprising a conduit or stack 21a coupled to a vent system in the plant (not shown) for maintaining a draft in the conduit 21. The lower ends of the conduits are secured to shroud enclosures 22 arranged at the oven inlet and at the oven outlet and equipped so that the food products carried by the conveyor may pass through the enclosures 22. The vapor control means 21 provides a draft adjacent to the oven inlet and outlet so that atmosphere from the oven as well as from the plant are taken up the stack thereby enabling control of the atmosphere within the oven at predefined levels of temperature and moisture content while substantially excluding air from entrainment into the oven through the product inlet 18 and outlet 19 openings.

As shown in FIGS. 1 and 2, the conveyor system 12 includes a linear inlet section 12a as well as a linear outlet section 12b each of which has a length disposed outside of the housing 11. The conveyor segment 12b is provided with means for aggressively cleaning the conveyor belt including a liquid-containing housing 26 wherein a plurality of brushes 27 engage the continuous conveyor belt 25 on opposite side thereof, the belt 25 being reeved over support rollers 28. The liquid within the housing 26 has the further function of cooling the belt so that the belt will be at substantially ambient temperature when products are loaded thereon adjacent the oven inlet 18. Another liquid treatment of the belt is had at the container 29 and this may include further cleansing or an anti-sticking dip of the belt as the cooking process dictates. Between the inlet 12a and outlet 12b linear sections of the conveyor system 12, there is arranged as an integral part thereof a spiral or helical conveyor section which may have the general configuration shown in U.S. Pat. Nos. 4,867,301 and 4,940,133 which are incorporated by reference herein.

Figure 4:
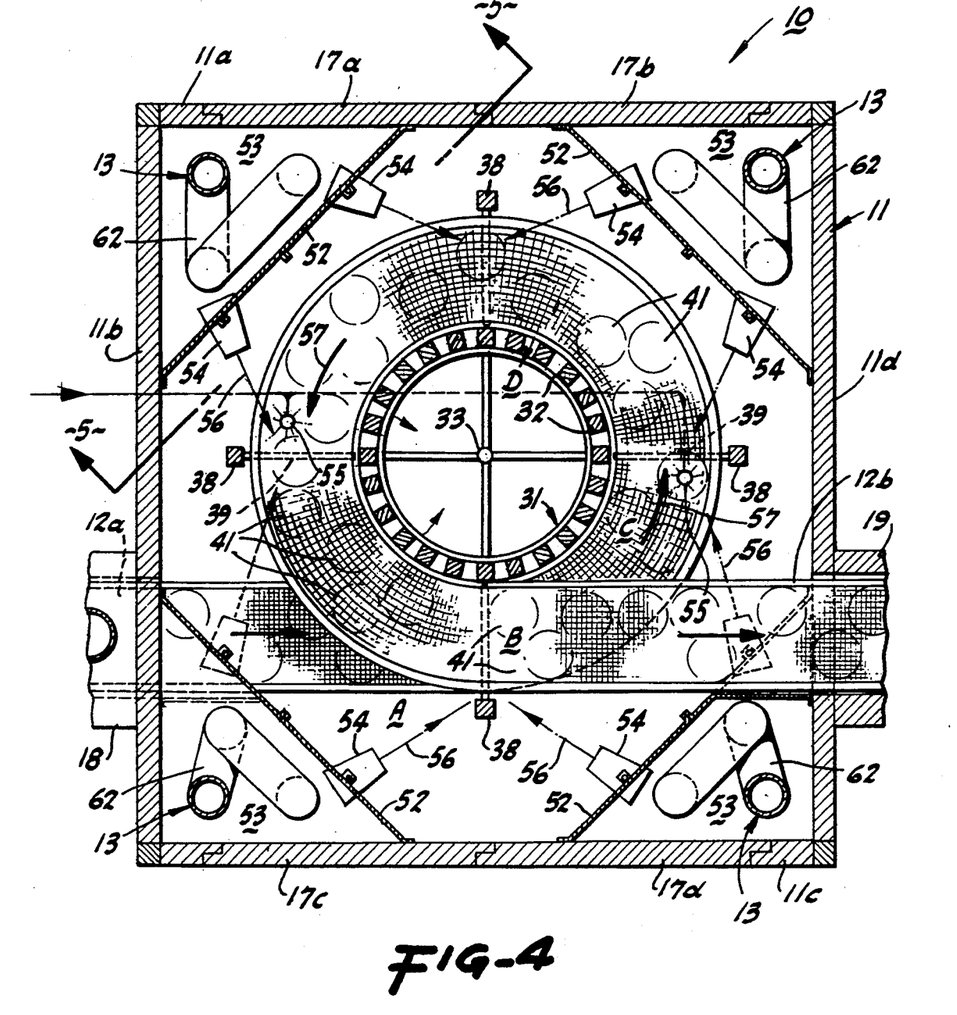
FIG. 4 is a sectional view taken in the direction of the arrows 4—4 of FIG.

The spiral or helical segment of the conveyor system 12 includes a vertically extending axially disposed central drive cage 31 made up of a lattice of vertical rods 32 disposed in a circular array, best shown in FIGS. 3 and 4. The cage is rotatably driven through a drive shaft 33 extending from the lower portion thereof and projecting through the bottom 11e of the housing 11. Suitable bearing supports 35 maintain the cage in the operative position. The lower end of the cage shaft 33 has mounted thereon a sprocket 34 which may be driven from a motor (not shown) via a drive chain 36. The upper end of the cage 31 is maintaining in operative position for concentric rotation by a number of circumferentially arranged roller supports 37 mounted on the interior mounted conveyor support frame 38. As disclosed in the above-mentioned patents, the cage 31 functions to drive the conveyor belt 25 by engagement of the radially inwardly projecting conveyor belt rod ends in sliding contact with the vertical lattice rods or bars 32.

Generally horizontally extending arms 39 project from the interior mounted conveyor frame 38 and serve as conveyor belt supports. The arms are maintained on the four or more vertical members of the inner frame 38 in a vertically spaced relationship to define the spiral or helical path the conveyor will follow through the oven 10. As may be seen best from FIG. 3, the arms 39 serve to establish the conveyor in a series of vertically arranged tiers or decks, one above the other, thereby affording a long expanse of conveyor belt within the oven 10 for establishing a long cooking path between the oven inlet and outlet.

From the above it will be understood that through powered rotation of the drive shaft 33, by the drive chain 36 and sprocket 34, the cage 31 turns about its vertical axis which serves to urge the conveyor belt 25 along its path on both the linear sections 12a and 12b as well as helical or spiral portions which are wholly contained within the oven housing.

Figure 5:
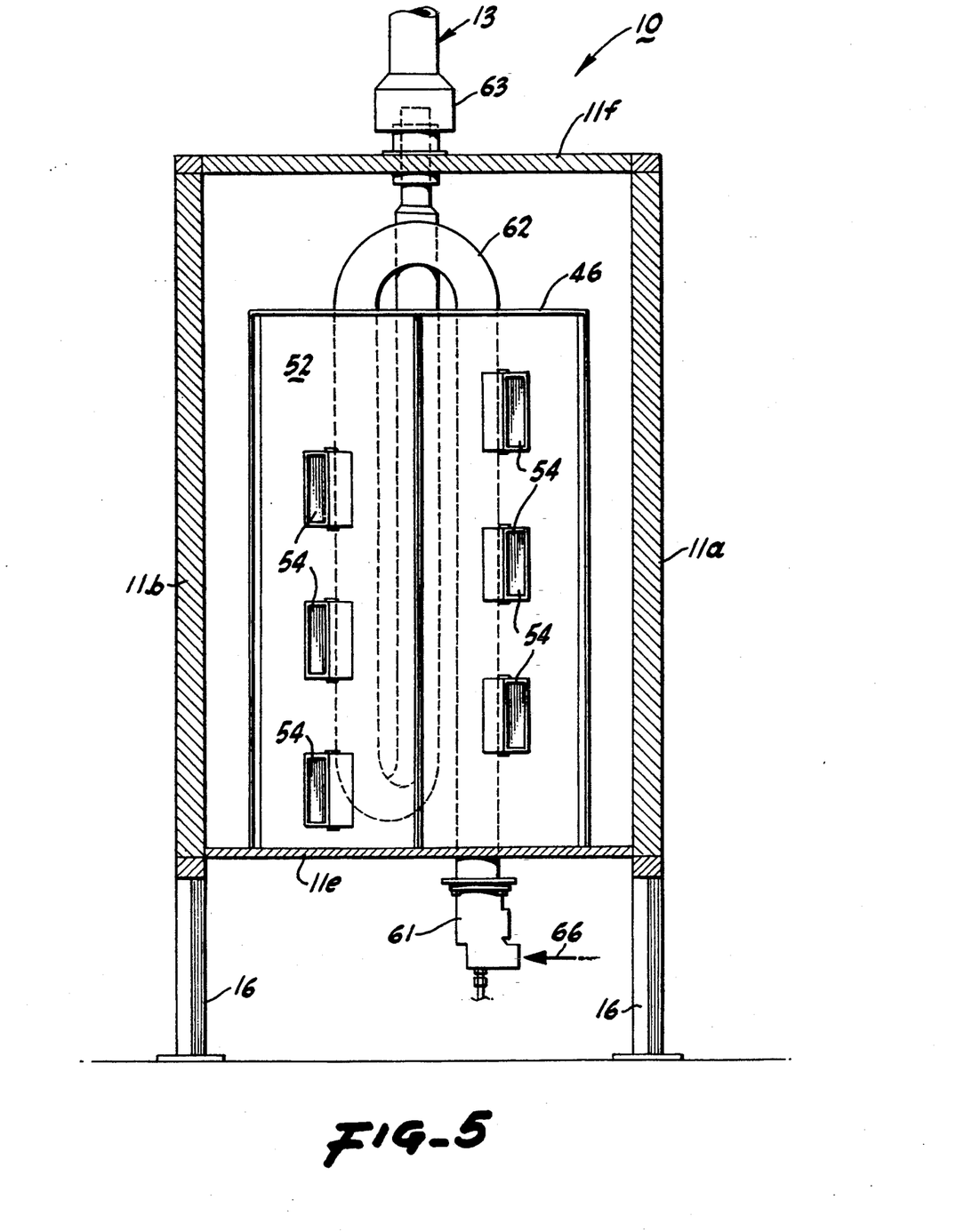
FIG. 5 is a sectional view taken from the direction of the arrows 5—5 of FIG. 4.

The heating means 13 and the vapor circulating fan means 14 co-act within the housing 11 in a novel manner which creates an excellent cooking environment for distributing the hot process vapor along the food products 41 (see FIG. 4) arranged on the conveyor belt. Referring specifically now to FIGS. 4 and 5, it will be seen that at the upper portion of the housing interior there is provided a generally horizontally extending baffle plate 46 supported from the upper housing wall 11f by a plurality of support rods 47. The top baffle has a central opening 48 which forms the throat to an inlet of a plug fan 49. The fan 49 is preferably a centrifugal fan having an impeller within the housing and is driven by a motor 51 mounted outside the housing 11 on the top wall 11f. As indicated in FIG. 3, in operation, the vapor circulating fan 49 draws process vapor from the central portion of the conveyor, generally the zone of the cage 31, and dispels the process vapor radially outwardly in the space between the baffle 46 and the top wall 11f as symbolized by the arrows 50. Often called a "plug fan," the unit 49 may operate to deliver 18,500 cubic feet per minute of cooking vapor when driven by a 10 horsepower motor 51.

A plurality of vertically arranged baffles 52 are disposed within the housing 11 to define plenums 53. One convenient arrangement has been found to dispose four baffles vertically between the lower housing wall 11e and the top baffle 46 spanning across the corners of the housing 11, best shown in FIG. 4. Here it will be understood that the upper baffle 46 is configured for substantially air tight connection with the vertical panels 52 such that the discharge from the plug fan 14 will pressurize each of the four plenums 53.

Cooking vapor distribution nozzles 54 are arranged among the plenums 53 to project therefrom at intervals that generally track the rise of the spiral conveyor. Desirably the nozzles are oriented such that they discharge into the space between consecutive tiers of the conveyor. More specifically, referring to FIGS. 4 and 5, it will be seen that the nozzles project outwardly from the vertical baffles 52 to distribute the cooking vapor in the direction of the arrows 56. In certain instances the flow as indicated by the arrows is in the direction concurrent to the movement of the conveyor as indicated by the arrows 57 and in other instances the flow from the nozzles is concurrent to the movement of the conveyor as indicated by the arrows 57.

The nozzles may have various shapes, but generally have a cross-section area on the order of thirty-five square inches and project or discharge the process vapor generally tangentially to the circumference of the helical conveyor section. This orientation is much preferred over nozzles which project radially towards the spiral's center and cause a "shadow" upon the inner product which receives much less heat than those closer to the nozzles.

The table below gives typical air velocity at locations designated in FIG. 4 as A, B, C and D, A being proximate to the discharge of the nozzle 54, location B being just at about the mid-point of the conveyor, C being somewhat farther away from the nozzle and on the conveyor belt, and location D being just inside the cage for return to the fan inlet.

| Location | NOZZLE-VELOCITY Feet Per Minute | | |
|---|---|---|---|
| | Low | Mean | High |
| A | 1676 | 2165 | 2653 |
| B | 1261 | 1588 | 1915 |
| C | 984 | 1238 | 1493 |
| D | 490 | 634 | 777 |

The capacity of the plug fan is on the order of 18,600 cubic feet per minute with the fan being driven by a ten horsepower motor, as mentioned above.

The process vapor heating and reheating means is of a noncontaminating design and shields the cooking atmosphere entirely from the products of combustion thereby preventing the introduction of NOX (nitrous oxides) which can have a color-affecting result on certain meat products. Further, the heating means may include electrically heated resistance elements or liquid heat exchanger radiation tubes. Shown in FIG. 5 of the drawings is a gas burner heating system including a gas/air burner 61 firing at the bottom of a tube array 62, which, in this instance, is a triple-pass array. The heating tubes exit the housing 11 through the top wall 11f into a stack assembly 63, FIG. 5. Fuel for the burner 61 and air are received as indicated by the arrow 66. The operation of the heating means is such that products of combustion are propelled through the tube array 62 giving off heat, into the stack system 63 thereby supplying heat in the plenum 53 wherein the tube array is located.

The circulation of the process vapor via the plug fan 49 passes the process vapor into the plenum 53 heated by the tube array heater means, the process vapor being discharged through the nozzles 54 towards the food product 41 carried upon the conveyor belt 25. The process vapor flows as indicated by the arrows 50 radially inward to the cage central zone of the conveyor to be drawn upwardly through the throat 48 of the plug fan through the opening in the top baffle 46.

EXAMPLES

From our prior experience with ovens of various types and from calculation made with regard to the oven 10 we predict that products will be cooked to a good commercial standard at the times and temperatures set forth below. The three typical products selected are widely distributed from the food processing industry and will demonstrate the advantages of the present invention.

| Whole Roasted Chicken | |
|---|---|
| Size: | 3.1 lbs. (average weight of broiler chicken) |
| Cook Time: | 40 minutes |
| Dry Bulb: | 325 F. |
| Wet Bulb: | 185 F. |
| Fan Speed: | 75% |
| Yield: | 72 to 80% depending on use of marinade |
| Rate: | 5000 lb/hr |
| Institutional Meatloaf | |
| Size: | 6 lbs. |
| Cook Time: | 45 minutes |
| Dry Bulb: | 300 F. |
| Wet Bulb: | 185 F. |
| Fan Speed: | 60% |
| Yield: | 90% |
| Rate: | 3000 lb/hr |
| Skinless, Boneless Chicken Breast and Thighs | |
| Size: | 3–4 ounce |
| Cook Time: | 6 minutes |
| Dry Bulb: | 275 F. |
| Wet Bulb: | 190 F. |
| Fan Speed: | 80% |
| Yield: | 84% |
| Rate: | 7,000 lb/hr |

The reference above to wet bulb and dry bulb temperature is an indication of the moisture content in the oven through the release of live, superheated steam into the oven 10 through the steam sparger 55, as shown in FIG. 3. The introduction and regulation of steam into a moving cooking atmosphere was disclosed in our prior U.S. Pat. Nos. 3,947,241 and 4,167,585 wherein the moisture control apparatus regulates the moisture content by reference to the wet bulb and dry bulb temperatures for establishing the dew point or moisture content within the cooking chamber.

SECOND EMBODIMENT OF THE INVENTION

Figure 6:
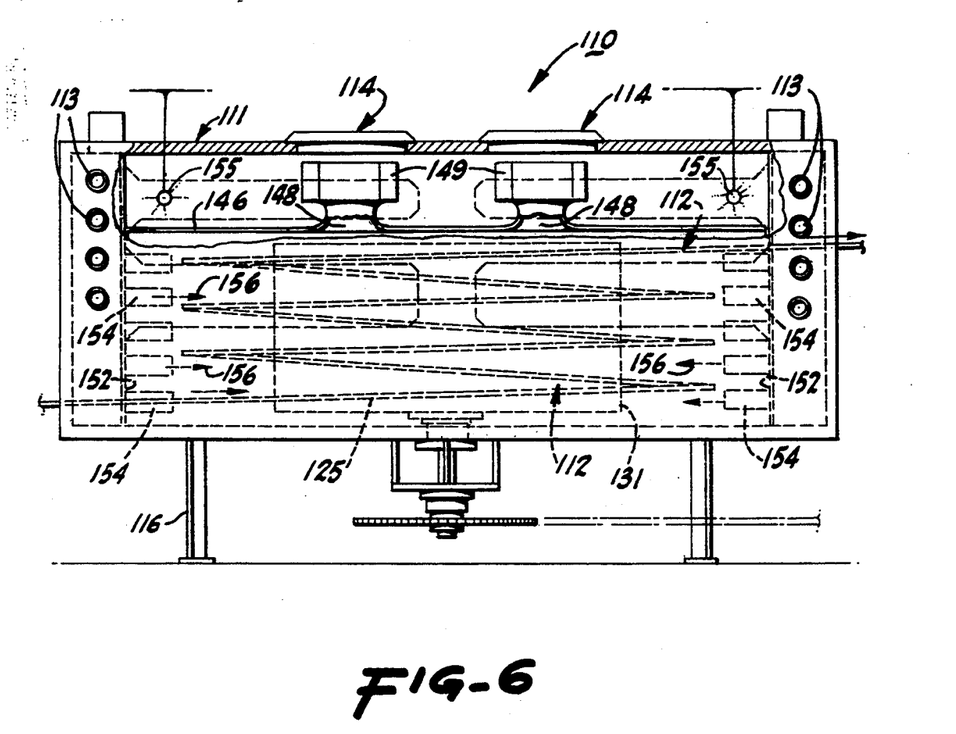
FIG. 6 is a view like FIG. 1, but showing another embodiment of the invention.
Figure 7:
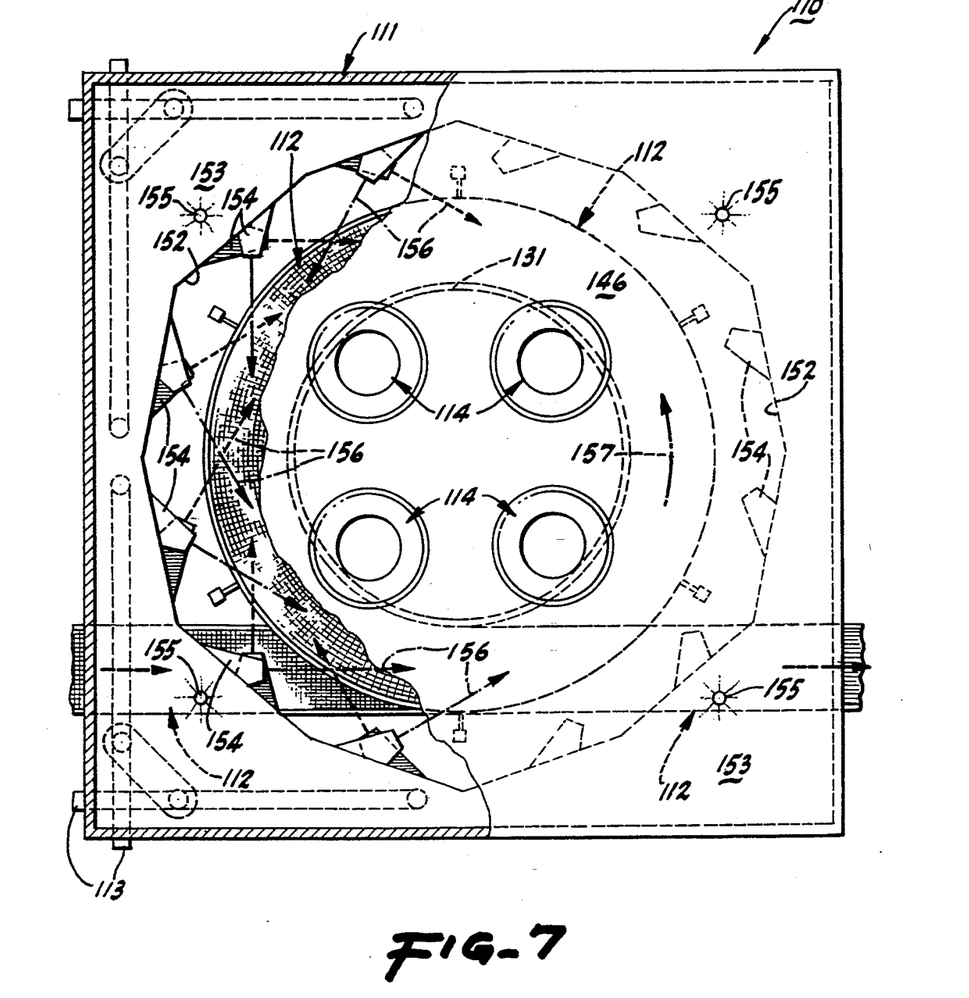
FIG. 7 is a plan view of the oven shown in FIG. 6.

Referring to FIGS. 6 and 7, another embodiment of the invention 110 is illustrated there and includes the insulated housing 111, a conveyor system 112, radiant tube burner heating means 113 and the vapor circulating fan means 114.

As was the case with the improved compact oven 10, the oven 110 includes a support frame 116 and other components in common with the oven 10 including portions not shown, doors, oven inlet, oven outlet and conveyor belt portions which extend through the inlet and outlet as well as the spiral conveyor 125. The inlets and outlets of the oven 110 are equipped with vapor control means constructed and arranged as described above as in the compact oven 10.

The housing 111 is provided with a generally horizontally extending top baffle 146 having four openings 148 to serve as throats or inlet openings for plug-type centrifugal fans 149. The four fans 149 are disposed in the central zone of the oven 110 in generally superimposed relationship to the drive cage 131 arranged therein. Vertical panels or baffles 152 are arranged in a generally twelve-side array viewed in plan spaced radially outwardly from the outer periphery of the helically arranged conveyor 125. At their lower margin the panels 152 are secured in a substantially airtight relationship with the bottom or floor of the housing 111 and along their upper margins are arranged in a substantially air tight relationship with the upper or top baffle 146, thereby to define a plenum system surrounding the spiral conveyor within the housing 111. Nozzles 154 project from the baffles 152 towards the spiral conveyor belt 125. Preferably, the nozzles may be disposed in a vertical array so that the nozzles issue the process vapor into the space between the superimposed tiers of the spiral conveyor, as illustrated in FIG. 6. In alternate vertical rows, the nozzles 154 may extend counter-current to the direction of conveyor movement as indicated by the arrow 157 so that the nozzles project the process vapor in the direction of arrows 156 as shown in FIG. 7. A supply of steam may be introduced into the oven through the conduit 155, FIGS. 6 and 7.

Disposed within the plenums 153 are the heating tubes 113 which are of the gas-fired radiant tube burner type. Alternatively, the heating units 113 may be electrical resistant units or transfer fluid heating units as are well known in the industry.

The structures described above function whereby products are introduced on the conveyor belt 125 and carried through the inlet (not shown) of the oven 110. The conveyor belt is driven through the drive cage 131 so that the products are carried along a spiral path through the oven 110 wherein they receive treatment from a circulating process vapor. The process vapor is generated within the housing by first introducing steam at a controlled rate so as to achieve a predeterminate rate of humidity within the housing while supplying to the housing with the radiant tube heat means 113. The process vapor is caused to circulate within the housing by the four plug fans 149 in a path wherein the process vapor is withdrawn from the central zone of the housing as defined more or less by the drive cage 131 and then propelled substantially horizontally by the fan discharge toward the plenums 153. The plenums thus pressurized serve as a reservoir of circulating process vapor which is discharged therefrom through the nozzles 154 in the direction of arrows 156.

The area of the discharge nozzle is selected in relation to the movement of the process vapors so as to cause a large measure of stimulated turbulence in the region of the nozzles. This is in contrast to direct impingement of process vapor which is not the intention of the inventors. The stimulated turbulence causes flow of the process vapor along the product carried on the belt uniformly throughout the lower, mid and higher tiers of the conveyor system and promotes even heat transfer to the food products. This has the effect of promoting a uniform appearing and uniformly cooked food product from ovens constructed in accordance with the principles of this invention.

It will thus be seen that the objects set forth above may readily and efficiently be attained and certain changes may be made in the above construction and differing embodiments of the invention made without departing from the scope hereof, it is intended that all matter contained in the above description or shown in the accompanying drawings shall be interpreted as illustrative and not in a limiting sense.

What is claimed is:

1. A continuous process for treating food products including these steps: providing an oven enclosure having a product inlet and product outlet and a spiral conveyor operative to move products within the oven; placing the food products upon the conveyor and carrying the products up a spiral incline towards the oven outlet while subjecting the products to a rapidly moving process vapor moving generally horizontally towards the products in a substantially non-radial direction with respect to the spiral conveyor; and removing the treated food products from the oven.

2. The continuous process of claim 1 wherein the process vapor is circulated from a first zone of generally annular form disposed radially outwardly of the spiral conveyor across the conveyor carrying the food products into a second zone disposed centrally of the conveyor and from there recirculated to the first zone.

3. The process of claim 2 and including the step of reheating the process vapor in a path of circulation between the first and second zone.

4. A continuous process for treating food products including these steps: providing an oven enclosure having a product inlet and product outlet and a spiral conveyor operative to move products within the oven; placing the food products upon the conveyor and carrying the products up a spiral incline towards the oven outlet;

generating a process vapor within the oven and circulating the vapor from a zone spaced from the outer perimeter of the spiral conveyor in a general tangential direction towards the food products of the spiral conveyor; and removing the treated food products from the oven.

5. A continuous process for treating food products comprising the steps:

providing a substantially closed oven housing having a product inlet and a product outlet disposed at different levels and a conveyor for carrying a food product in a spiral path extending between the product inlet and outlet, the conveyor having a central axial zone;

providing a process vapor within the housing at a temperature higher than that of the food product while minimizing substantially entrainement of air into the process vapor;

introducing a food product through the oven inlet onto the product carrying conveyor; circulating the process vapor to engage the food product while conveying the product along the spiral path through the oven;

moving the process vapor towards the food product in a flow path extending generally laterally across the spiral path of the conveyor from the outer periphery of the conveyor into the central axial zone of the conveyor;

recirculating the process vapor within the oven housing in a return path extending from the axial zone to the outer periphery of the conveyor; reheating the process vapor along the return path following its contact with the food product; and removing the food product from the oven through the outlet.

6. The process of claim 5 wherein the process vapor is reheated within the oven housing in a zone separated from the product treatment zone of the oven.

7. The process of claim 5 wherein water vapor is maintained and controlled in the process vapor during the recirculation of the process vapor serving to control the moisture content of the product.

8. The process of claim 5 including the step of circulating the process vapor to impinge upon the product from a plurality of distinct flow paths spaced along the spiral path;

the process vapor flow paths being directed generally tangentially to the spiral path; certain of the process vapor flow paths being con-current and others being counter-current to the direction of food product movement through the oven.

9. The process of claim 8 wherein the spiral path for food conveying includes a plurality of 360 degree turns and the con-current and counter-current process vapor flow paths alternate in flow direction along each turn in the spiral path.

* * * * *

UNITED STATES PATENT AND TRADEMARK OFFICE
CERTIFICATE OF CORRECTION

PATENT NO. : 5,407,692
DATED : April 18, 1995
INVENTOR(S) : Caridis et al.

It is certified that error appears in the above—identified patent and that said Letters Patent is hereby corrected as shown below:

In column 1, line 8, delete "2" after "199" and insert therefor --1--.

In column 2, line 66, after the word "FIG.", insert --3.--.

In column 8, line 49, delete "of" after the word "products" and insert therefor --on--.

Signed and Sealed this

Eighteenth Day of July, 1995

Attest:

BRUCE LEHMAN

*Attesting Officer*　　　　*Commissioner of Patents and Trademarks*